(12) United States Patent
Larose et al.

(10) Patent No.: US 9,372,252 B2
(45) Date of Patent: Jun. 21, 2016

(54) OUTDOOR OBJECT LOCATION SYSTEM AND METHOD THEREOF

(71) Applicant: Secure Care Products, LLC, Concord, NH (US)

(72) Inventors: Albert Larose, Dracut, MA (US); Doug Richard, Tilton, NH (US); Matthew Cammack, Weare, NH (US); Christopher D. Stevens, Belmont, NH (US); Mike Singer, Concord, NH (US); Sam Corliss, Concord, NH (US); Vijaya Kodali, Nashua, NH (US); Ray Scott, Webster, NH (US)

(73) Assignee: Secure Care Products, LLC, Concord, NH (US)

( * ) Notice: Subject to any disclaimer, the term of this patent is extended or adjusted under 35 U.S.C. 154(b) by 255 days.

(21) Appl. No.: 14/242,231

(22) Filed: Apr. 1, 2014

(65) Prior Publication Data

US 2014/0232600 A1 Aug. 21, 2014

Related U.S. Application Data

(63) Continuation-in-part of application No. 13/426,052, filed on Mar. 21, 2012, now Pat. No. 9,069,057.

(51) Int. Cl.
*G01S 3/02* (2006.01)
*G01S 1/24* (2006.01)
*G01S 5/02* (2010.01)
*G01S 5/06* (2006.01)

(52) U.S. Cl.
CPC *G01S 5/0205* (2013.01); *G01S 5/06* (2013.01)

(58) Field of Classification Search
CPC .......................... G01S 7/2955; H04W 64/003
USPC .......................... 342/387, 444, 457, 463–465; 455/456.1, 457
See application file for complete search history.

(56) References Cited

U.S. PATENT DOCUMENTS 6,233,459 B1   5/2001  Sullivan et al.
9,069,057 B1 * 6/2015  Larose ..................... G01S 5/06

* cited by examiner

*Primary Examiner* — Dao Phan
(74) *Attorney, Agent, or Firm* — Hayes Soloway, P.C.

(57) ABSTRACT

A system and method for locating an object is provided. A locating circuit substantially secured to the object. A plurality of monitoring units are positioned remotely from the locating circuit, each positioned in a different location, wherein at least a portion of the plurality of monitoring units are positioned in an outdoor environment. An omnidirectional signal is intermittently communicated between the locating circuit and the plurality of monitoring units. A calculator is in communication with each of the plurality of monitoring units. The calculator determines a duration of transmission time of the omnidirectional signal for each of the plurality of monitoring units, and the locating circuit. The calculator calculates a location of the locating circuit using the determined duration of transmission time for each of the plurality of monitoring units and the locating circuit.

20 Claims, 6 Drawing Sheets

OUTDOOR OBJECT LOCATION SYSTEM AND METHOD THEREOF

CROSS REFERENCE TO RELATED APPLICATION

This application is a continuation-in-part application of U.S. application Ser. No. 13/426,052 filed Mar. 21, 2012, the entire disclosure of which is incorporated herein by reference.

FIELD OF THE DISCLOSURE

The present disclosure is generally related to locating objects and more particularly is related to an outdoor object location system and method thereof.

BACKGROUND OF THE DISCLOSURE

Determining the location of an object or a person within or proximate to a structure is a feature that many industries, companies and individuals desire. Within various industries, determining the location of an object in a timely and accurate manner may save money and time, but may also minimize the risk of injury or a security breach. For example, in today's hospitals and medical facilities locating systems are used to determine the approximate location of infants and the elderly. When a baby is born, a security tag is attached to their leg to prevent abduction of the infant during their stay at the hospital. When an abductor attempts to remove the infant from the hospital, proximity sensors may signal an alarm to sound. Similar systems are used in nursing homes to prevent residents with mental handicaps from exiting the building without authorization. Many industries do not have locating systems in use, due to their expense and inconvenience in using them. For example, malls and shopping centers commonly only provide stationary maps with an indication of where the map is located relative to the building.

These current systems may include a real-time locating system (RTLS), which may facilitate locating an object within a building. These systems operate by utilizing a number of different techniques, including sending pinging signals, RFID technology, ultrasound and other conventional locating technologies. Similarly, GPS may be used for locating objects in certain instances. However, these current systems are expensive and may only work under specific conditions. For example, GPS may fail to work when the satellite signal is lost, such as when the GPS receiver is within a tunnel. Likewise, the proximity sensors used in hospitals may only indicate the presence of a security tag, and fail to provide any further information.

Thus, a heretofore unaddressed need exists in the industry to address the aforementioned deficiencies and inadequacies.

SUMMARY OF THE DISCLOSURE

Embodiments of the present disclosure provide a system and method for locating an object. Briefly described, in architecture, one embodiment of the system, among others, can be implemented as follows. A locating circuit is substantially secured to the object. A plurality of monitoring units are positioned remotely from the locating circuit, each positioned in a different location, wherein at least a portion of the plurality of monitoring units are positioned in an outdoor environment. An omnidirectional signal is intermittently communicated between the locating circuit and the plurality of monitoring units. A calculator is in communication with each of the plurality of monitoring units, the calculator determining a duration of transmission time of the omnidirectional signal between each of the monitoring units and the locating circuit and calculating a location of the locating circuit using the determined duration of transmission time for each of the monitoring units and the locating circuit.

The present disclosure can also be viewed as providing a method of locating an object. In this regard, one embodiment of such a method, among others, can be broadly summarized by the following steps: substantially securing a locating circuit to the object; remotely positioning a plurality of monitoring units from the locating circuit, wherein each of the plurality of monitoring units is positioned in a different location, wherein at least a portion of the plurality of monitoring units are positioned in an outdoor environment; intermittently communicating an omnidirectional signal between the locating circuit and each of the monitoring units; determining a duration of transmission time of the omnidirectional signal for each of the monitoring units and the locating circuit; and calculating a location of the locating circuit using the determined duration of transmission time of the omnidirectional signal for each of the monitoring units and the locating circuit.

The present disclosure can also be viewed as a system for locating an object in a substantially open-air environment. Briefly described, in architecture, one embodiment of the system, among others, can be implemented as follows. A locating circuit is substantially secured to the object, the locating circuit having an omnidirectional signal intermittently transmitted. At least two sensors are each positioned in a distinct, substantially stationary location in a substantially open-air environment, wherein the at least two sensors are located in at least one vertical plane, and wherein the at least two sensors receive the omnidirectional signal. A substantially water resistant enclosure houses at least a portion of each of the three sensors. A calculator is in communication with each of the at least two sensors, wherein the calculator determines an elapsed time between an emission time of the omnidirectional signal by the locating circuit and receiving time of the omnidirectional signal at each of the at least two sensors and calculates a location of the locating circuit using the determined elapsed time for each of the at least two sensors. A display element displays a graphical representation of an open-air environment setting, wherein the calculated location of the locating circuit is expressed in at least two dimensions, relative to the graphical representation of the open-air environment setting.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
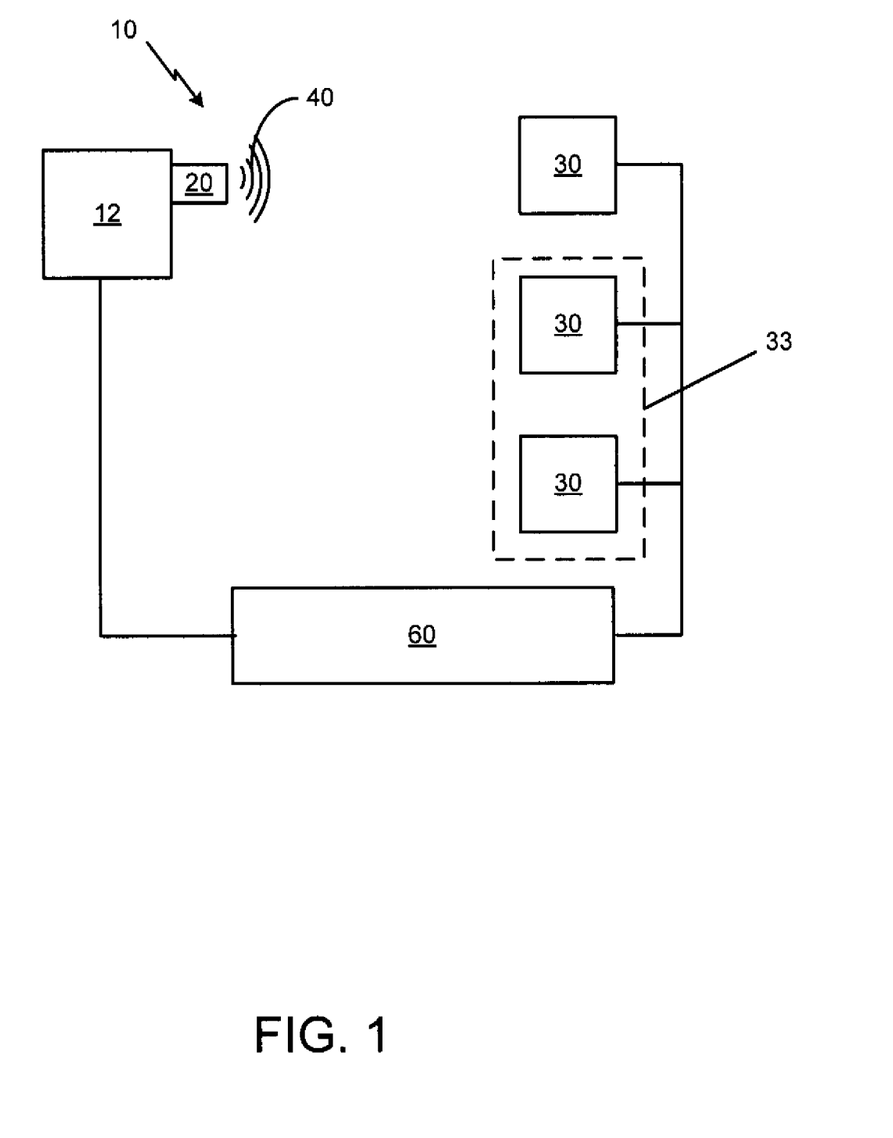
FIG. 1 is a block diagram illustration of a system for locating an object, in accordance with a first exemplary embodiment of the present disclosure.

FIG. 1 is a block diagram illustration of a system 10 for locating an object, in accordance with a first exemplary embodiment of the present disclosure. The system 10 for locating an object, which may also be referred to throughout this disclosure as the system 10, includes a locating circuit 20 substantially secured to an object 12 being located. A plurality of monitoring units 30 is positioned remotely from the locating circuit 20, wherein each of the plurality of monitoring units 30 is positioned in a different location, and where at least a portion of the plurality of monitoring units is located in an outdoor environment 33. An omnidirectional signal 40 is intermittently communicated between the locating circuit 20 and the plurality of monitoring units 30. A calculator 60 in communication with each monitoring unit 30 may determine a duration of transmission time of the omnidirectional signal 40 between each of the monitoring units 30 and the locating circuit 20 and calculate a location of the locating circuit 20 using the determined duration of transmission time for each of the monitoring units 30 and the locating circuit 20.

The system for locating and/or tracking an object 10 may be used in a variety of industries where it is desirable to locate and track an object. In many industries, such as the health care industry, for example, it is desirable to know where a specific object is located at a specific time, whether an individual or a medical device. Conventional systems used within certain industries today, like the health care industry, generally include devices that utilize a plurality of transmitters affixed to people or objects and a plurality of proximity sensors that sense when the transmitter is located nearby. These devices are commonly used to prevent the unauthorized transportation of an infant within a maternity ward of a hospital, or the unauthorized exit of an elder care facility by a resident. Although these devices are successful at detecting the proximity of a transmitter to an access point, they fall short of providing a significant amount of other information that is pertinent to the location of the human or object.

For example, conventional locating devices are only capable of determining a location of the transmitter relative to the proximity sensor. Accordingly, a proximity sensor on an exit or entrance doorway may be able to sense a nearby transmitter, but it is incapable of determining whether the transmitter is located on the exit side of the doorway or the entrance side of the doorway. Likewise, in a multi-story building, a doorway proximity sensor on the third floor may detect a transmitter that is located on the fourth floor, directly above the doorway proximity sensor's location on the third floor. This may result in many false positive determinations of locations, i.e., an indication that the transmitter is about to be moved through the doorway, when in fact it is not even on the same floor as the doorway. The system for locating an object 10 described in accordance with this disclosure may replace and/or work in conjunction with these conventional locating devices.

The system 10 may be used in any industry, field, or setting, for any number of applications where locating and/or tracking an object is desirable. Primarily, the system 10 may provide significant benefits within the health care industry, such as when used in hospitals, medical centers, doctors offices, nursing homes, retirement homes, and any other medical facility. Furthermore, the system 10 is designed for use in an outdoor environment 33, or open-air environment. In accordance with this disclosure, an outdoor environment 33 may include any environmental setting that is at least partially outdoors. This may include open-air environments, partially open-air environments, fully or partially outdoor settings, or any other setting where the object is at least partially exposed to an outdoors atmosphere. For example, the system 10 may be particularly well suited in fully outdoor environments 33 such as parks, fields, lawns, or outdoor recreational areas. The system 10 may also be used in open-air structures, such as stadium, ballparks, or other venues.

There is a great need for locating objects 12 within outdoor environments 33, especially within the healthcare industry. For example, patients and residents of medical facilities that are currently subject to monitoring may be restricted from exiting the structure they're within, since medical staff is unable to monitor their location when they leave the structure. This means that patients and residents of medical facilities may miss out on the benefits of being outdoors, such as exercise, fresh air, interaction with nature, etc. Additionally, many open-air settings may be the location for recreational events, such as ball games. However, the stadiums or ballparks where the events are held can often be extremely large, and thus, an easy place for people to get lost or separated from a group. The system 10 may be used in these open-air environments to locate objects 12, which includes people and/or animals. The system 10 of the first embodiment, and all additional embodiments, are described in this disclosure in relation to medical facilities, namely hospitals or large medical buildings, and outdoor areas or open-air facilities that may be proximate to, or likely to be used by medical patients or staff. However, the system 10 may also be used in any other industry, such as the retail industry, entertainment industry, etc., without reservations.

The system 10 may be considered a real-time locating system (RTLS), which may be used to locate, track and identify an object in real time. In accordance with this disclosure, "real-time" as used with a RTLS may be characterized as occurring at substantially an actual and true time or event, or in occurrence with the specific time of an actual event occurring. In other words, the system 10 may be capable of determining a location of an object 12 in such a brief time period that the location of the object 12 that the system 10 provides is substantially the same as the location of the object 12 when it is first sensed or determined by the system 10. However, as those skilled in the art are aware, various factors may cause slight delays or insignificant changes in a RTLS system. These may include delays of fractions of a second due to computer processing, device functions, transmission times, and similar factors. These delays or changes in a RTLS are expected and do not hinder the functionality of the RTLS.

The system 10 may be used to locate any number or type of objects 12, which may include locating human beings, movable or non-movable equipment, packages in transportation or storage, or any other type of object. For example, the system 10 may locate a patient or a doctor within a medical facility, a wheelchair being used to transport a patient, a package of medicine in storage or a visitor to a medical facility. In other industries, the system 10 may be capable of locating any type of object or entity within any type of structure, regardless of the size of the object, the movement of the object or the size of facility. In accordance with this disclosure, the object 12 may include any device, entity or article, living or non-living, movable or stationary, or any combination thereof. As will be described in more detail, the system 10 may have many potential uses and offer many benefits.

The system 10 includes a locating circuit 20 that is capable of working in conjunction with other components of the system 10 to locate an object 12 that the locating circuit 20 is secured to. When the system 10 in use, the locating circuit 20 should correspond to the location of the object 12, whether generally corresponding or specifically affixed thereto. For example, the locating circuit 20 may generally correspond to the object 12 if it is secured to the exterior of a box or container that houses the object 12. Alternatively, the locating circuit 20 may be specifically secured to the object 12. In accordance with this disclosure, the locating circuit 20 may correspond to the location of the object 12 by any number of ways, including a locating circuit 20 that is secured to, located on, positioned with or otherwise associated with the object 12 directly and/or a container or packaging housing the object 12. The locating circuit 20 may continue to correspond to the location of the object 12 while the system 10 is in use, i.e., until the locating circuit 20 is removed from its location proximate to the object 12. Any other configurations for corresponding the location of the locating circuit 20 with the location of the object 12 may also be used, all of which are considered within the scope of the present disclosure.

The locating circuit 20 may be permanently secured to the object 12 or removably secured to the object 12, which may depend on the type of object 12. For example, the locating circuit 20 may be integral with a band (wrist, ankle or other appendage), an identification badge, or another wearable article that is removably secured to a human being. The human being, who may be a patient, doctor or visitor of a hospital or medical facility, may secure the wearable article having the locating circuit 20 on their person for a predetermined shortened period of time, i.e., a work shift, or for a long period of time, such as an extended hospital stay. For example, the system 10 may be used within a hospital maternity ward, wherein the locating circuit 20 is affixed to the leg of a newborn child with an ankle band soon after the child is born. In another example, a locating circuit 20 may be embedded within the ID badge of a doctor, thereby allowing the doctor's location within the hospital to be known by the system 10.

The locating circuit 20 may include one or a variety of different types of circuits, transmitters, transmitting devices, computerized chips, computer-compatible chips, or other electronic circuitry. The number and type of circuits included with the locating circuit 20 is dependent on the design and functionality of the locating circuit 20, all of which are considered within the scope of the present disclosure. The locating circuit 20 may be compatible with any of the applicable Institute of Electrical and Electronics Engineers (IEEE) standards and may be compatible with ultra-wideband (UWB) technology, wherein the locating circuit 20 may run on a low power supply, such as a small battery, and be used at low energy levels for short-range, high-bandwidth communications. For example, the locating circuit 20 may be compatible with IEEE 802.15.4a UWB, any WIFI™ enabled device, or any other communication medium. As an example, one type of locating circuit 20 may be a 802.15.4a UWB chip.

The locating circuit 20 may include many other characteristics or features to enhance the utility of the system 10. For example, the locating circuit 20 may have a small size, thereby allowing it to fit within various wristbands, ankle bands or other articles that are secured to an object 12. This may include a locating circuit 20 with a size of approximately 7.0 sq mm, but may also include sizes smaller or larger than 7.0 sq mm. The locating circuit 20 may be small enough to be easily attached to an object 12 with many types of fasteners, including adhesives, mechanical fasteners, hook and loop fasteners, with integral connections or any other connections or fasteners available. The locating circuit 20 may also run on any type of power source, and may commonly only require a minimal amount of power that can be supplied by a battery. The locating circuit 20 may run on any type of battery, including any electrochemical device such as button cell batteries, AAA, AA, 9V, or another type of battery. The battery may be rechargeable, non-rechargeable, replaceable or irreplaceable, depending on the design of the locating circuit 20. Preferably, the locating circuit 20 may use a very low amount of power, such as provided from a button cell battery, which may allow the locating circuit 20 to be operational for substantially longer time than conventional chips. For example, the locating circuit 20 may be operational for any number of hours, days, weeks or even years without replacing or recharging the battery, whereas some conventional chips may require recharging daily or weekly.

The monitoring units 30 are each located in a variety of places, including within a facility, such as within a hospital or other building, or in an outdoor environment 33, such as a recreational area. The system 10 includes at least a portion of the monitoring units 30 located in an outdoor environment 33, such that the system can locate objects 12 in the outdoor environment 33. In accordance with this disclosure, an outdoor environment 33 may include any position external to a building or facility, or in a structure that is at least partially exposed to an outside atmosphere, such as an open-air stadium. For example, the monitoring units 30 may be located on an outdoors deck or porch, a lawn or grassy area, along trails, roadways, or paths, or in an open-air facility, such as a stadium, a ball park, or a sports complex. The type of outdoor environment 33 or the configuration thereof is not limiting to implementation of the system 10.

As discussed previous, the system 10 is described herein in relation to health care facilities, such as hospitals, but the system 10 may be used with any facility, including retail facilities, entertainment facilities, etc. Generally, the number of monitoring units 30 used with the system 10 will be dependent on the type and size of the facility, as well as the intended use of the system 10 and the volume of objects 12 being located. Any number of monitoring units 30 may be included with the system 10, as may depend on the design of the system 10. For example, small facilities may only require a small number of monitoring units 30, whereas larger, multi-storied facilities may require many monitoring units 30.

The monitoring units 30 may be located in a position that is remote from the locating circuit 20. This may include any position that is at least a few centimeters from the locating circuit 20, but may commonly include positions that are more than a few centimeters, more than a meter, more than 10 meters or more than a hundred meters from the locating circuit 20. Any location of the monitoring unit 30 with respect to the locating circuit 20 is considered within the scope of this disclosure, and the specific placement of the monitoring units 30 may vary depending on the size and type of the facility that they are located in. Locations may be indoors or outdoors, and each of the individual monitoring units 30 within the system 10 may have different locations from one another, which may include different distances to each other, placement on different floors of a structure, and/or placement at different heights on the same floor of a structure. Different locations may generally include locations where a substantial distance is present between individual monitoring units 30, such as 5 meters, 10 meters, 25 meters, 50 meters or any other distance. It may be advantageous for the distance between individual monitoring units 30 to be as great as possible, thereby reducing the number of monitoring units 30 within the system 10, which may decrease an overall cost of the system 10.

The monitoring units 30 may be positioned in substantially stationary positions, such as affixed to the wall, ceiling or floor of a structure and may be located indoors or outdoors. However, semi-stationary positions may also be used, such as movable monitoring units 30 that can be kept stationary for a period of time while the system 10 is in use. For example, the monitoring units 30 that are located in an outdoor environment 33 may be affixed to the side of a building, within a structure in a lawn or field, or within other structures, such as lampposts. In some cases, the monitoring units 30 may be positioned out in the open, such that they can be viewed by anyone in the vicinity, or they may be positioned out of sight. For example, when a large outdoor environment 33 is being monitored by the system 10, it may be advantageous to place monitoring units 30 under a ground surface, such that they do not obstruct a recreational activity, but are still able to locate the object 12.

The monitoring units 30 may be located in a variety of places relative to an outdoor structure, location, or terrain. The monitoring units 30 may be positioned in stationary or movable locations, housed in structures and/or other devices, or positioned within the ground. The exact positioning of the monitoring units 30 may be dependent on the specific use of the system 10. For example, the system 10 may be used to monitory the location of firefighters who are actively engaged in an emergency situation, such as a structure fire. Movable monitoring units 30 may be placed about the structure that is on fire when the firefighters arrive at the location, and may be used to monitor the firefighters' location and/or movement. The system 10 may be capable of identifying if a firefighter is located within the structure and does not move for a predetermined period of time, and subsequently send an alert or sound an alarm to warn others that the firefighter may be in danger. The system 10 may be capable of other uses as well that may be dependent on identifying a movement and/or location of a locating circuit 20 on an object or human being.

As discussed previously, the number of monitoring units 30 may vary depending on the design of the system 10. However, the number of monitoring units 30 may also correspond to the desired result of the system 10, such as the desired level of accuracy of the system 10. For example, using only one monitoring unit 30 may allow the system 10 to calculate a distance of the locating circuit 20 secured to the object 12, not unlike a proximity sensor, whereas using only two monitoring units 30 may allow the system to calculate a two-dimensional location of the object 12. Using two or more monitoring units 30 positioned in at least one plane may allow the system 10 to calculate a three-dimensional location of the locating circuit 20. The required number of monitoring units 30 relative to the dimensions sensed is based on the principle that determining a location of an object 12 requires determining the location of one position relative to other defined reference positions. In other words, unambiguity of a determined or calculated location occurs in one-dimensional space with two reference points, in two-dimensional space with three reference points and in three-dimensional space with three or more reference points absent other constraints. Locating an object 12 in four dimensions may also be possible, as discussed with regards to tracking the location of an object 12 over a period of time.

Furthermore, it is noted that it is possible to use monitoring units 30 in combination with constraints. For example, two monitoring units 30 may be used in combination with an algorithm that can be used to place restraints, constraints or limit positional possibilities. The algorithm restraint may be used, for example, to determine an upper ceiling or a bottom floor of the possibility of positions of the locating circuit 20. The algorithm may also include a sensing of a direction of movement, rate of movement, or rate of force applied to the locating circuit 20, among other sensed qualities. In this example, if two monitoring units 30 are used, the location of the locating circuit 20 may be calculated based on a distance from each of the two monitoring units 30, which can be used to map possible locations of the locating circuit 20 along intersecting spheres. The intersection of the spheres mapping the possible location of the locating circuit 20 may circular or elliptical in shape, and when the algorithm is applied to that circular or elliptical shape, the possible positions of the locating circuit 20 may be further narrowed. For instance, the locating circuit 20 would not be location along a portion of the mapped path that is above an upper ceiling or below a bottom floor.

To provide an example of using the algorithm with two monitoring units 30, or more than two monitoring units 30 it is possible to include a locating circuit 20 within a sporting item, such as a basketball. When the basketball moves in a game between players and teams within a basketball court, the monitoring units 30 may identify its location. An algorithm may be used to identify the floor of the court (bottom floor) and perhaps the ceiling of the court (upper ceiling). When the mapped circular or elliptical shape is positioned partially beyond the floor or the ceiling, the algorithm can exclude those portions from the possible locations of the basketball. Similarly, when it is detected that the basketball is moving between 0-5 feet off the floor of the court, an algorithm can be used to identify the movement as dribbling. The possibilities of identifying the position of the basketball are numerous, since the use of the algorithm in combination with the monitoring units 30 and other sensors, e.g., accelerometers, can effectively calculate a position of the basketball.

The ability to locate an object 12 in three dimensions may have many utilities. In conventional systems using proximity sensors, a proximity sensor on one floor of a structure may detect the presence or proximity of a transmitter attached to an object 12 on a different floor. For example, a proximity sensor positioned on a doorway on the fourth floor of a building, and controlling access through the doorway, may sense the proximity of an object 12 on the third floor, and erroneously shut off access to the doorway on the fourth floor based on the sensed object 12 on the third floor. This can cause inefficient and ineffective location monitoring, and may lead to many erroneous determinations, and ultimately, many security failures.

Locating an object 12 in three dimensions may prevent this erroneous determination, since the height of the object 12 can be determined, and thus, an assessment of what floor the object 12 is on can be made. Similarly, locating the object 12 in three dimensions may allow the system 10 to determine if the object 12 is located within a building or in an outdoor environment 33 proximate to the building. Furthermore, locating an object 12 in three dimensions may also allow the system 10 to determine if an object 12 having a locating circuit 20 has changed a height position, due to an external cause, such as falling down, being lifted up, etc. For example, this may allow the system 10 to determine if an elderly patient has fallen, or if an infant has been lifted out of a crib, as well as many other scenarios.

The system 10 may require the positions of the monitoring units 30 to be known positions, relative to the structure or facility that they're located in, and/or relative to one another. This may be achieved via any number of methods and devices, including determining the locations of the monitoring units 30, calculating the locations of the monitoring units 30 relative to one another, using a positioning device, such as Global Positioning System (GPS), or any other similar system. As discussed later, the positions of the monitoring units 30 may be known by other components of the system 10, such as the calculator 60, and may be used in calculating the position of the object 12.

The system 10 uses an omnidirectional signal 40, or a plurality of omnidirectional signals 40 that are intermittently communicated between the locating circuit 20 and the plurality of monitoring units 30. The omnidirectional signal 40 may include any type of signal characteristic, and may be transmitted at Ultra Wide Band (UWB) and WiFi™ frequencies, as well as other frequencies of other communication mediums. Preferably, transmission occurs between frequencies of between 3.244 GHz and 6.99 GHz and/or greater than 6.99 GHz. A frequency of at least 3.244 GHz may overcome absorption of the omnidirectional signal 40 by various obstacles, namely portions of the human body. One of the uses of the system 10 is to determine the location of a human who has a locating circuit 20 affixed to their person with a wristband or similar device. The position of the locating circuit 20 proximate to the human's body may cause the body to absorb or delay some of or the entire omnidirectional signal 40 depending on its frequency. Likewise, the location of a human body between the locating circuit 20 and one of the monitoring units 30 may absorb some or all of the omnidirectional signal 40. Absorption of the omnidirectional signal 40 may interfere with the timing of transmission of the omnidirectional signal 40, which in turn, may affect the accuracy of the system 10. Other obstacles may also absorb the omnidirectional signal 40, including building structures like walls and floors, large pieces of equipment, and other structures.

It has been determined through experimentation and testing that an omnidirectional signal 40 transmitted at a frequency of at least 3.244 GHz may overcome a substantial portion of any absorption of the omnidirectional signal 40. Thus, transmitting the omnidirectional signal 40 at a frequency of at least 3.244 GHz may allow the system 10 to function successfully. Furthermore, it has also been determined that transmitting the omnidirectional signal 40 at a frequency of at least 3.244 GHz, or between 3.244 GHz and 6.99 GHz may overcome substantially all absorption of the omnidirectional signal 40 by a human body, or other obstacles. Accordingly, the system 10 may emit the omnidirectional signal 40 above 3.244 GHz, but preferably above 3.244 GHz, and more preferably between 3.244 GHz and 6.99 GHz. Transmission at or above 6.99 GHz may overcome substantially 100% of any biological signal absorption. Transmission of the omnidirectional signal at approximately 6.99 GHz may allow the system 10 to determine the location of the locating circuit 20 secured to the object 12 without interference from biological signal absorption. It is noted that other emission frequencies may also be used, including more precise frequency ranges or frequencies above 6.99 GHz, as may depend on the design and use of the system 10. Any frequency emission is considered within the scope of the present disclosure.

The omnidirectional signal 40 may be communicated between the locating circuit 20 and the plurality of monitoring units 30 in a variety of ways, including via one-way communications, two-way communications, or any other type of communication. For example, the omnidirectional signal 40 may commonly be communicated or transmitted from the locating circuit 20 to the plurality of monitoring units 30. In one of many alternatives, the plurality of monitoring units 30 may each transmit the omnidirectional signal 40 to the locating circuit 20. As can be seen, the omnidirectional signal 40 may be transmitted from and received by either or both of the locating circuit 20 and the monitoring units 30. The locating circuit 20 and/or the plurality of monitoring units 30 may each include any number or type of receiver, transmitter and/or transceiver.

A system 10 may include many locating circuits 20 each transmitting many omnidirectional signals 40 to a plurality of monitoring units 30. For example, a plurality of locating circuits 20 may be used in a structure where many objects 12 are desired to be located at the same or similar times. Each of the locating circuits 20 may be secured to an object 12, and each may transmit an omnidirectional signal 40 to any number of monitoring units 30. The plurality of monitoring units 30 may each transmit the omnidirectional signal 40 to the plurality of locating circuit 20, as the case may be. Any number of locating circuits 20 and objects 12 may be located within the system 10, including 10, 50, hundreds or thousands of locating circuits 20, which may be located simultaneously or at intervals, all of which are considered within the scope of the present disclosure.

The calculator 60 may determine a duration of transmission time of the omnidirectional signal 40. Accordingly, the calculator 60 may include any number of computerized devices, having any type of processors and a variety of computerized programs capable of performing calculations. For example, the calculator 60 may include a computer program carrying out instructions on a computer processor. The calculator 60 may determine a duration of transmission time of the omnidirectional signal 40 for each signal communication in a variety of ways, all of which may be capable of determining the duration of the transmission time of the omnidirectional signal 40 between a start transmission time and an end transmission time, and between the components that the omnidirectional signal 40 is being communicated between. For example, the calculator 60 may determine the duration of the transmission time for each omnidirectional signal 40 that is transmitted from the locating circuit 20 to each of the plurality of monitoring units 30, respectively. Thus, if a system 10 includes six monitoring units 30 and one locating circuit 20, then the calculator 60 may determine six transmission time durations.

It is noted that the calculator 60 may determine any number of transmission time durations between any number of monitoring units 30 and locating circuits, which includes determining only the transmission time durations of a portion of the total transmitted omnidirectional signals 40. For example, if a system 10 has one hundred (100) monitoring units 30, each receiving an omnidirectional signal 40 from only one locating circuit 20, the calculator 60 may determine some, all or any portion of the total number of transmitted omnidirectional signals 40. Similarly, the calculator 60 may be capable of determining the transmission durations of a plurality of omnidirectional signals 40 that are transmitted between a plurality of locating circuits 20 and a plurality of monitoring units 30, respectively. The number of determinations that the calculator 60 makes may depend on the number of transmission durations required for calculating a location. Although only three or more monitoring units 30, and thus only three transmission durations, are needed for determining a location in three-dimensional space, additional transmission durations may be used to verify a calculated location.

The calculator 60 may determine the transmission durations in a number of ways. For example, the locating circuits 20 may each include embedded firmware that calculates time on board, which may be used by the calculator 60 to calculate and triangulate a three-dimensional location based on the synchronized timing of the omnidirectional signals 40 received. The firmware within the locating circuits 20 may include data indicative of a time-stamp, such as a start time time-stamp of the transmission. When the omnidirectional signal 40 is received at a monitoring unit 30, the monitoring unit 30 may place a second time-stamp on the omnidirectional signal 40, indicative of a received time. Accordingly, a duration of transmission time may be calculated based on the time-stamps.

The calculator 60 determines the transmission durations in other ways too. For example, the calculator 60 may include software that is capable of facilitating two-way ranging between the locating circuits 20 and the monitoring units 30, and/or real-time locating. Two-way ranging may include independently ranging three or more fixed monitoring units 30 with known locations to at least one locating circuit 20. The calculator 60 may then calculate three distances, which define three circles to a point of intersection, which may be determined to be the location of the locating circuit 20. Other ways may include using a Time Difference of Arrival (TDOA) scheme utilizing a clock that is synchronized between each of the monitoring units 30. In this design, each of the locating circuits 20 may transmit the omnidirectional signal 40 at predetermined intervals. Each of the monitoring units 30 may receive the transmitted omnidirectional signal 40 and timestamp them. To ensure accuracy within the system 10, clock synchronization must be completed, whereby the timestamps of each of the omnidirectional signals 40 received must be synchronized. The calculator 60 eventually calculates the position of the locating circuit 20 based on the time-stamped omnidirectional signals 40.

Another way to determine the duration of transmission time is by determining the precise duration of the transmission time for each of the omnidirectional signals 40. For example, if the omnidirectional signal 40 is received at two or more monitoring units 30, the calculator 60 may determine three durations of time, i.e., durations represented by variables a, b and c. As discussed above, this may be accomplished by programming the locating circuit 20 to transmit the omnidirectional signal 40 at a precise time, coordinating that precise time with the calculator 60, and then determining the duration of time between when the omnidirectional signal 40 was transmitted and when it is received at each of the monitoring units 30. Alternatively, the omnidirectional signal 40 may carry data indicative of a start transmission time. The calculator 60 may then determine a received or end transmission time at the monitoring unit 30 and compare the start and end times with each other. It is noted that the determined durations of transmission time may, in some instances, be the same duration. This may indicate that the locating circuit 20 is located exactly halfway between two monitoring units 30.

In one of many alternatives, the calculator 60 may determine a difference in the duration of transmission time of the omnidirectional signal 40 relative to one monitoring unit 30 of the plurality of monitoring units 30 and the duration of transmission time of the omnidirectional signal relative to another monitoring unit 30 of the plurality of monitoring units 30. For example, the calculator 60 may determine a first transmission duration, or a time of receiving the omnidirectional signal 40 at one monitoring unit 30, and then compare that time with the times that other monitoring units 30 receive the omnidirectional signal 40. In this case, the durations of transmission may be given in relative variables, i.e., $n_1$, $n_2$, $n_3$, etc., or $a+n_1$, $a+n_2$, $a+n_3$, etc., where variable a is the one determined transmission duration and each subscript n stands for the difference in time between receiving a at one monitoring unit 30 and each of the additional monitoring units 30.

It is contemplated that the system 10 may include a large number of objects 12, each having a locating circuit 20 secured thereto, and each located at substantially the same time. When determining the location of each of the objects 12, the calculator 60 may need to make a significant number of measurements and/or determinations in a short period of time. For example, in many large hospitals, hundreds if not thousands of patients, medical and facility personnel, including doctors, nurses, technicians, secretaries, janitors, etc., may be located with the system 10. If only 100 of these people are desired to be located in one second, each using only one locating circuit 20 and two or more monitoring units 20, three hundred calculations may need to be made in that one second. However, with larger facilities, tens or hundreds of monitoring units 30 may be used, which may compound the number of measurements that must be made. To limit the number of measurements, to limit computation or measurement time, the calculator 60 may be programmed, instructed or choose to only determine the transmission duration of the omnidirectional signals 40 received at a specific monitoring unit 30. In other words, only a few of an available total monitoring units 30 may be required to determine the transmission duration of an omnidirectional signal 40. This may be specified by a distance from the monitoring unit 30 to the locating circuit 20, a carrying load of the monitoring unit 30, the number of locating circuits 20 in a given area, or other factors.

The calculator 60 is in communication with each of the plurality of monitoring units 30 and calculates a location of the locating circuit 20 using the determined duration of transmission time for each of the plurality of monitoring units 30 and the locating circuit 20. Communication to and from the calculator 60 may include any communication system and the calculator 60 may include or be embedded with any device capable of performing one or more calculations. This may include a computerized device having a processor that runs a quantity of computer-readable code, where the code may have instructions for performing the calculations, such as a personal computer (PC) or a server or mobile programmable device. The calculations that the calculator 60 makes may be substantially based off of the determined transmission durations for the omnidirectional signal 40. The calculator 60 may compare the different transmission durations, and determine a location of the locating circuit 20 that the omnidirectional signal 40 was transmitted from. As discussed previously, the location of the locating circuit 20 may be expressed in a variety of ways, including in one, two or three-dimensions to an accuracy at or beyond at least 0.1 meters of a true location of the locating circuit 20.

The calculator 60 may calculate the location of the locating circuit using one or more timing algorithms. A timing algorithm may be variable-based expression that provides a numerical representation of a location based off of inputs the determined transmission durations from each of the plurality of monitoring unit 30 and known mathematical concepts. This essentially eliminates the need for conventional methods and systems for determining a location, including pinging, RFID based systems, ultrasonic systems or radar systems, that rely on the timing of a returned transmission signal. The system 10 ultimately determines the location of the object 12 with the determined transmission durations, or a comparison thereof. Accordingly, determining the transmission durations to a precise degree is necessary for accuracy within the system 10. The timing algorithms may allow the system 10 to determine the location of the object 12 to a high degree of accuracy, such as within 10 cm in a three-dimensional space. However, the system 10 is capable of accuracy to any degree, including those less than or greater than 10 cm in a three-dimensional space.

It is noted that any of the abovementioned features may be carried out on any number of calculators 60 that are embedded with various components of the system 10. For example, the portion of the calculator 60 that determines transmission durations may be distinct or separate from the portion of the calculator 60 that determines a location based on the transmission durations. Similarly, other processes and steps within the system 10 may be carried out by the plurality of monitoring units 30, the locating circuit 20, and/or the calculator 60, or any combination thereof. Any of these components may include any number of computerized processors, storage databases or software, as may be dependent on the design of the system 10. Accordingly, any variations to the system 10 as described herein are considered within the scope of the present disclosure.

Figure 2:
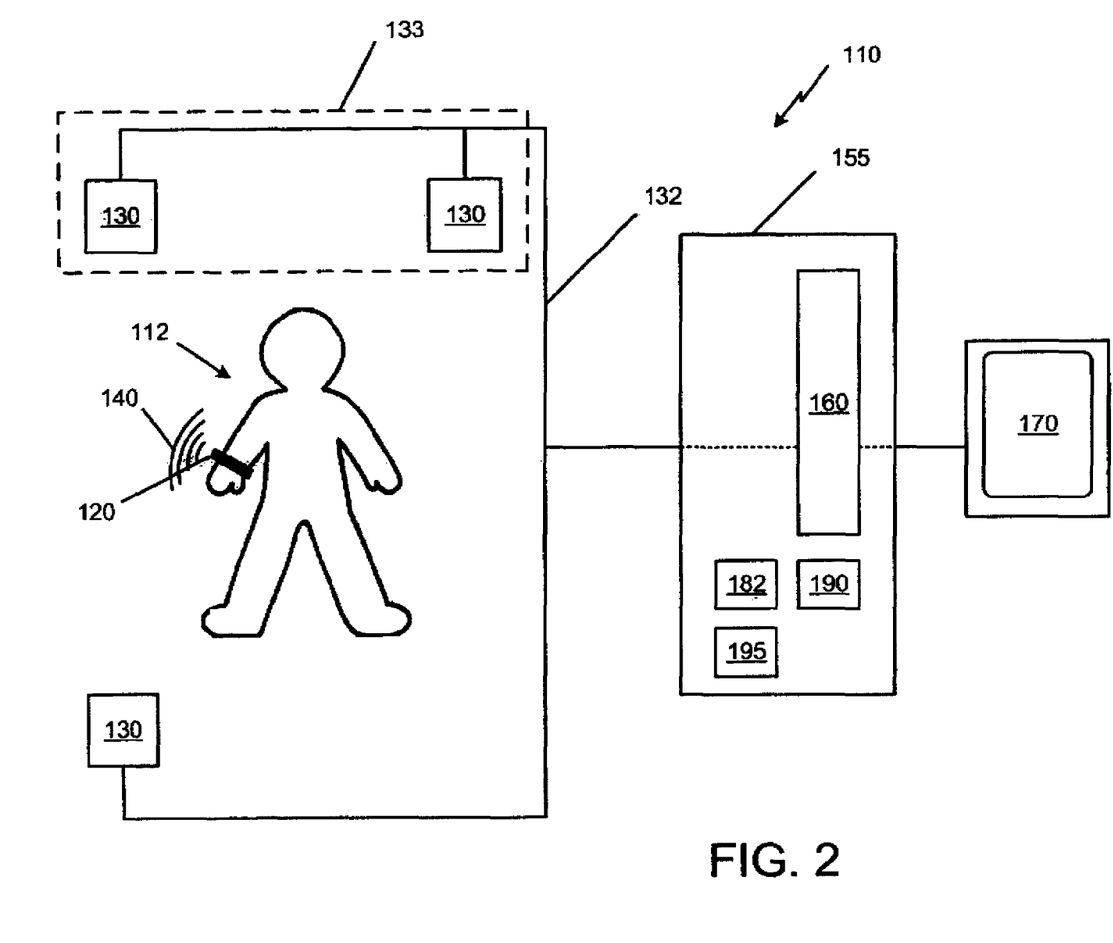
FIG. 2 is a block diagram illustration of a system for locating an object, in accordance with a second exemplary embodiment of the present disclosure.

FIG. 2 is a block diagram illustration of the system for locating an object 110, in accordance with a second exemplary embodiment of the present disclosure. As can be seen, the locating circuit 120 is housed within an ankle band that is attached to an object 112 depicted as an adult human. The locating circuit 120 may also be attached to a wrist or any other part of the body. The locating circuit 120 transmits an omnidirectional signal 140 that is received at a number of monitoring units 130. At least a portion of the monitoring units 130 is located in an outdoor environment 133. The monitoring units 130 are in communication with the calculator 160 via a number of communication lines 132. The communication lines 132 may be wired or wireless. The calculator 160 is housed in a computerized device 155, which may be any type of computerized device, such as a laptop, desktop PC, server, mobile programmable device, or similar computing device. A display device 170 is in communication with the calculator 160. The display device 170 may include any type of display device, such as a computer monitor, television, tablet display, personal electronic display, or any other display device. The display device 170 may be in communication with the calculator 160 via any communication connection, including over a network or the Internet. For example, the display device 170 may be communicating with the calculator 160 via a website, whereby a user of the system 110 opens the website to view a graphical depiction of a navigatable structure 172 (FIG. 3) that the system 110 is used with.

Figure 3:
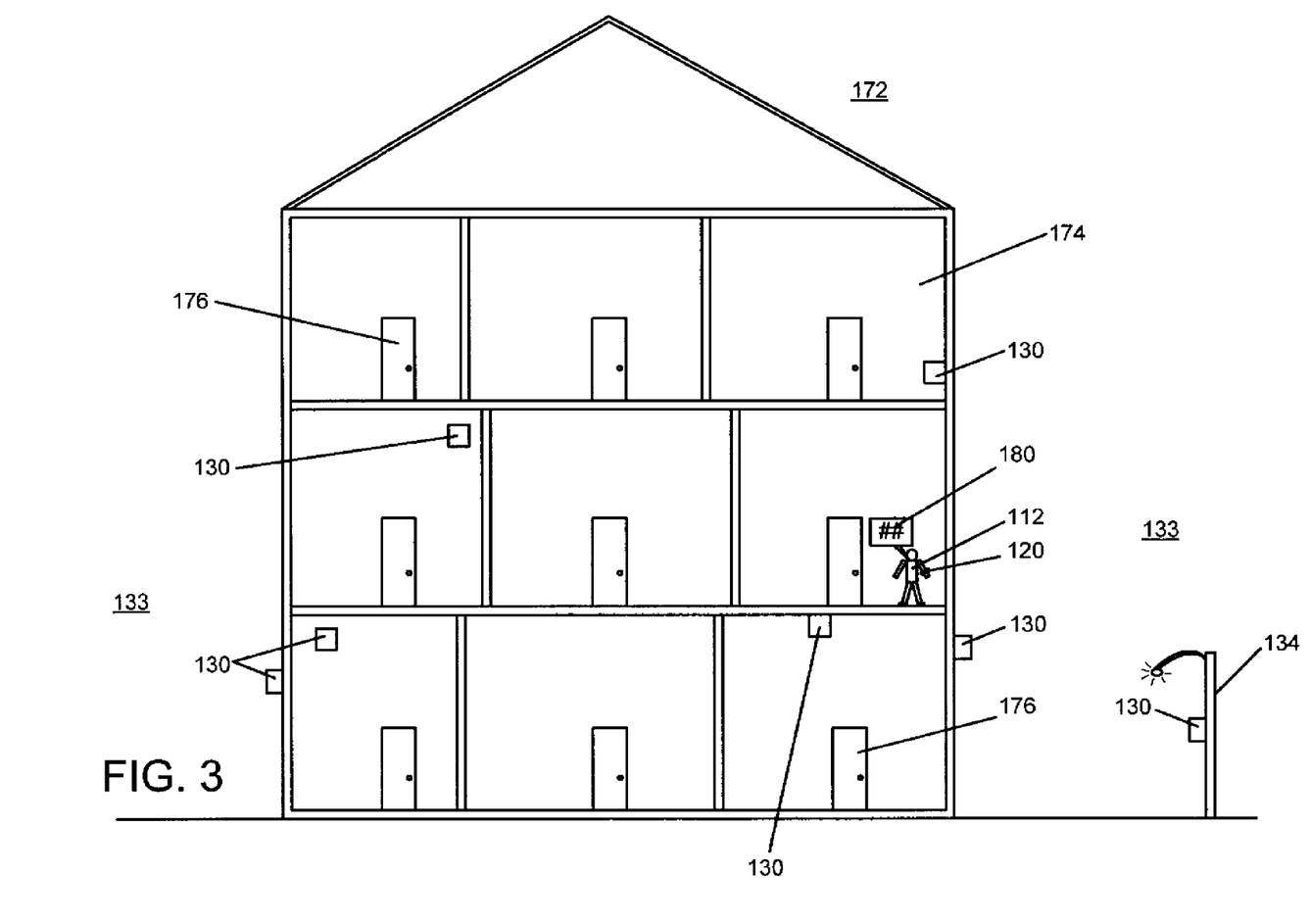
FIG. 3 is an illustration of the graphical depiction of a navigatable structure with the system for locating an object, in accordance with the second exemplary embodiment of the present disclosure.

FIG. 3 is an illustration of a graphical depiction of a navigatable structure 172 proximate to an outdoor environment 133 with the system 110 for locating an object 112, in accordance with the second exemplary embodiment of the present disclosure. The graphical depiction of a navigatable structure 172 may be any graphical depiction displayed on the display device 170, which includes a map or blueprint of a structure. The graphical depiction of a navigatable structure 172 may include structure features, such as hallways, rooms 174, doorways 176 or any other features. Additionally, the graphical depiction of a navigatable structure 172 may include depictions of system 110 components, such as the monitoring units 130 and the locating circuit 120. The outdoor environment 133 may be an exterior location of the navigatable structure 172. As can be seen, monitoring units 130 may be located within the navigatable structure 172 and within the outdoor environment 133.

The graphical depiction of a navigatable structure 172 may depict the object 112 having the locating circuit 120 in the location that the system 110 determines the object 112 to be in. For example, in FIG. 3, the object 112, which is depicted as a human being, is illustrated as being within a room and located near an exterior wall. Other locations may also be depicted in the graphical depiction of a navigatable structure 172, such as those in relation to a room number, a floor number, a structure sector or department, a coordinate within the structure or a room thereof, or any other location. Additionally, the location may be depicted in relation to an environmental feature, such as a road, a tree, or any other feature of the outdoor environment 133. The type and style of the graphical depiction of a navigatable structure 172 may depend on the type of structure and the use of the system 110. For example, the graphical depiction of a navigatable structure 172 may include a three-dimensional depiction of a structure whereby a user of the system 110 can rotate, move or navigate through the depiction. Other graphical depictions of a navigatable structure 172 may be aerial view two-dimensional depictions or cross-sectional two-dimensional depictions.

The outdoor environment 133 includes at least one monitoring unit 130 positioned therein. As can be seen in FIG. 3, the monitoring units 130 may be affixed to the structure, or may be affixed to another structure within the outdoor environment 133, such as a lamppost 134. The positioning of the monitoring units 130 within the outdoor environment 133 may be similar to the specifications discussed with respect to FIGS. 1 and 2, including the distance between monitoring units 130, etc. Furthermore, it may be advantageous to position the monitoring units 130 within the outdoor environment 133 in locations where they are not subject to frequent damage from the weather, tampering, or vandalism. For example, the monitoring units 130 may be located a certain distance, such as 10 or 12 feet, from a ground surface, thereby preventing someone from tampering with or vandalizing the monitoring unit. As will be discussed with respect to FIG. 4, the monitoring unit 130 may be placed within a structure to prevent damage to it.

The graphical depiction of a navigatable structure 172 or terrain may further include one or more identification elements 180 that are assigned to the locating circuit 120. In FIG. 3, the identification element 180 is illustrated as a tag containing identification information that is assigned to the object 112 or the locating circuit 120. Other identification elements 180 may also be used, such as virtual tags with names, descriptions, ID number, reference number or any other identification characteristic. When a system 110 includes multiple objects 112 being located with multiple locating circuits 120, identification elements 180 may become necessary to decipher between each of the objects 112 and locating circuits 120.

With reference to FIGS. 2-3, the system 110 may include an identification system 182 to assign, organize or otherwise facilitate the identification elements 180. The identification system 182 may be a computerized program enabled on the computerized device 155. In use, each type of object may be assigned a categorized identification element 180, which may be color-coded or numerically coded. This may include categorizing the identification elements 180 between doctors and patients, human beings and non-living objects, wheelchairs and medicine, etc. This may also include identification elements 180 that allow a user of the system 110 to view the name of an object 112 depicted in the graphical depiction of a navigatable structure 172 or terrain. For example, the system 110 may allow a user to see that Dr. Smith is located 1 meter from the entrance door of the operating room D on the third floor, or see that Patient X is located outside a building, 25 meters from an exterior door. To accomplish this, an identification number or serial number on each locating circuit 120 may be assigned to correspond to a specific object 112, and that correspondence may be entered into the computerized program. A user may then use any number of filters or menus to select or narrow which objects 112 to view on the graphical depiction of a navigatable structure 172 or terrain.

An instruction mechanism 190 may also be included in the system 110. The instruction mechanism 190 may be used to send one or more instructions to an instruction-receiving device external to the system 110. As is shown in FIG. 2, the instruction mechanism 190 may be a component within the computerized device 155 and may include programmable code. The instruction mechanism 190 may be capable of or positioned to send at least one instruction to at least one instruction-receiving device. For example, the instruction-receiving device may include a doorway opening mechanism that receives an instruction to open from the instruction mechanism. Other instruction-receiving devices may include doorway closing devices, security devices, transportation device, lights and entertainment devices, just to name a few.

The instruction mechanism 190 may send the instruction when the calculated location of the locating circuit 120 substantially matches a predetermined location. In other words, when the locating circuit 120 secured to the object 112 is positioned at a specific location, the instruction mechanism 190 sends an instruction to an instruction-receiving device that may be located nearby that location. For example, the instruction mechanism 190 may send an instruction to a set of lights to turn on when a locating circuit 120 is detected near the set of lights. Another example may be for the instruction mechanism to open a doorway when the locating circuit 120 is within a three or four meter area of the doorway. In yet another example, the instruction mechanism 190 may send an instruction to a locking device within a doorway to lock when a specific locating circuit 120 is positioned within a specified location near the doorway. A number of additional features may be included with the instruction mechanism 190, such as override abilities, adjustable predetermined locations and remote instruction-receiving devices, etc., all of which are included within the scope of the present disclosure.

A tracking element 195 may also be provided with the system 10. As is shown in FIG. 2, the tracking element 195 may be a component of the computerized device 155 and may be enabled with computerized code. The tracking element 195 may be capable of tracking the calculated location of a locating circuit 120 over a period of time, or throughout a plurality of times. The tracking element 195 may accomplish this by having a memory that stores each calculated location of the locating circuit 120, or any portion thereof, at a plurality of times. The tracking element 195 may depict the stored locations on the graphical depiction of the navigatable structure 172, such that a user of the system 110 can visibly see a previous location of the locating circuit 120.

The tracking element 195 may be beneficial in providing historical information on the location of an object 112. For example, a locating circuit 120 may be secured to a drug rehabilitation patient in a medical facility, where the patient is restricted from leaving his or her room. If the patient were to escape his or her room, a user of the system 110 could use the tracking element 195 to see where the patient currently is, and where the patient has been since his or her escape. Accordingly, the tracking element 195 could indicate if the patient has accessed areas of the medical facility where medicine is stored. The tracking element 195 may also be used for tracking locating circuits 120 for any other reason, all of which are considered within the scope of the present disclosure.

Figure 4:
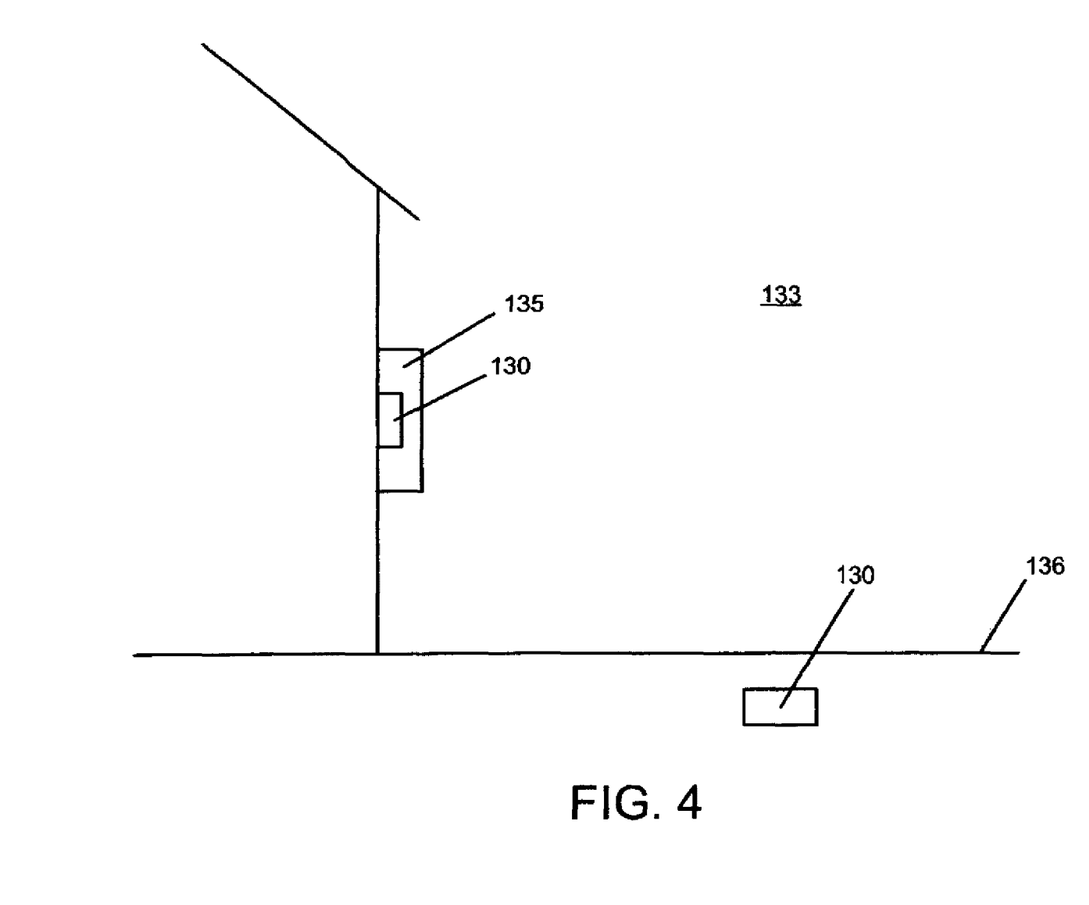
FIG. 4 is an illustration of an outdoor environment having a plurality of monitoring units, with the system for locating an object, in accordance with the second exemplary embodiment of the present disclosure.

FIG. 4 is an illustration of an outdoor environment 133 having a plurality of monitoring units 130, with the system 110 for locating an object 112, in accordance with the second exemplary embodiment of the present disclosure. The system 110 may include any number of monitoring units 130 within the outdoor environment 133, positioned in a variety of places. For example, a monitoring unit 130 may be affixed to the side of a building, as is shown. The monitoring unit 130 may have an enclosure 135 at least partially surrounding it. The enclosure 135 may be any enclosure, including a substantially water resistant, watertight, or water repellant, or waterproof enclosure that is capable of preventing inclement weather from damaging the monitoring unit 130. The enclosure 135 may also be lockable to prevent anyone from tampering with or vandalizing the monitoring unit 130. Also illustrated in FIG. 4 is a monitoring unit 130 positioned below the ground surface 136 in the outdoor environment 133. A monitoring unit 130 positioned below the Earth's surface may allow for implementation of the system 110 without complications from weather, vandalism, or other tampering. Of course, the system 110 may include monitoring units 130 positioned in many other places within an outdoor environment 133, all of which are considered within the scope of the present disclosure.

Figure 5:
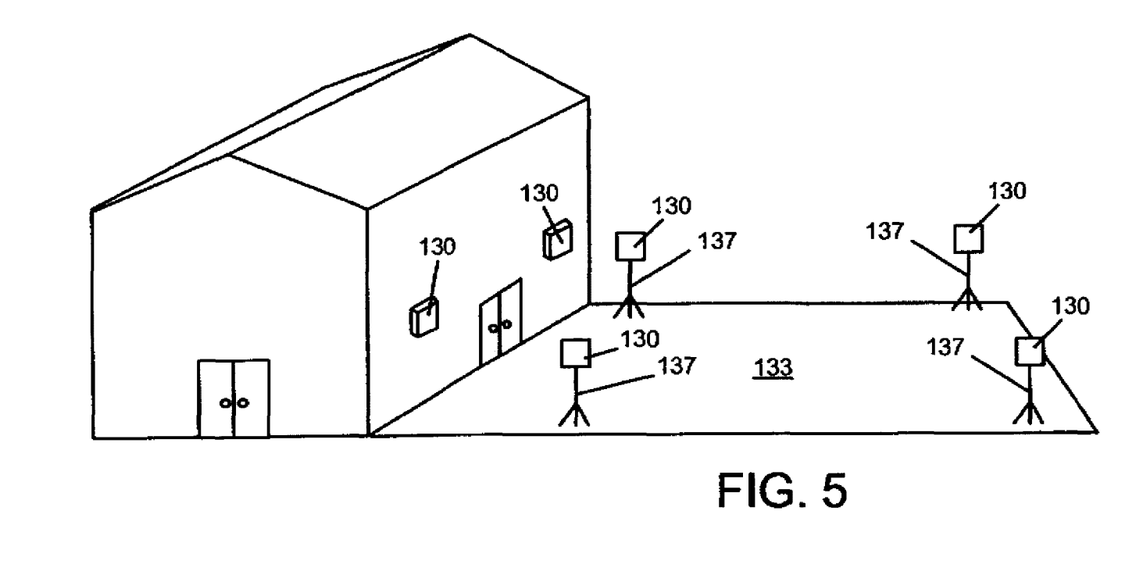
FIG. 5 is an illustration of a building proximate to an outdoor environment having a plurality of monitoring units, with the system for locating an object, in accordance with the second exemplary embodiment of the present disclosure.

FIG. 5 is an illustration of a building proximate to an outdoor environment 133 having a plurality of monitoring units 130, with the system 110 for locating an object 112, in accordance with the second exemplary embodiment of the present disclosure. Similar to FIG. 4, the system 110 may include any number of monitoring units 130 positioned in an outdoor environment 133. In FIG. 5, some of the monitoring units 130 may be permanently affixed to the exterior of the building, whereas some of the monitoring units 130 may be positioned on holding structures 137. The holding structures 137 may include any structure capable of holding a monitoring unit 130, such as a post, a pole, and/or a tripod. It may be preferable for the holding structures 137 to be movable, such that they can be placed in various positions within the outdoor environment 133. For example, the holding structures 137 with monitoring units 130 may be positioned within the outdoor environment 133 while there is a need to locate objects, such as when patients are located outdoors. When the need to locate objects is over, such as when the patients go back inside, the holding structures 137 with monitoring units 130 may be removed and placed in storage. When the monitoring units 130 are movably located, it may be required to program their location into the system 110, or otherwise detect their location, such as through a GPS.

Figure 6:
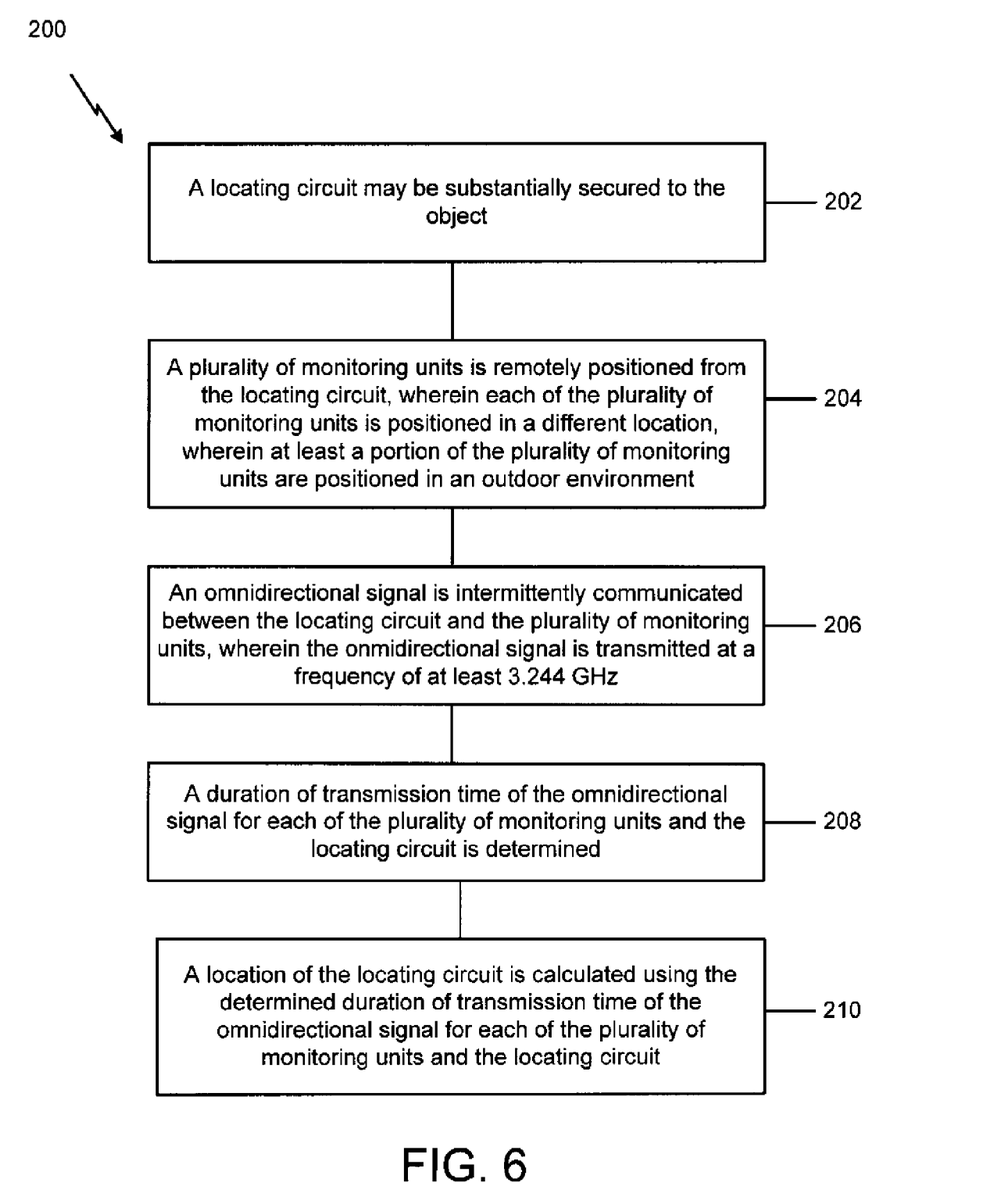
FIG. 6 is a flowchart illustrating method of locating the object, in accordance with the first exemplary embodiment of the disclosure.

FIG. 6 is a flowchart 200 illustrating method of locating the object 12, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, a locating circuit may be substantially secured to the object. A plurality of monitoring units is remotely positioned from the locating circuit, wherein each of the plurality of monitoring units is positioned in a different location, wherein at least a portion of the plurality of monitoring units are positioned in an outdoor environment (block 204). An omnidirectional signal is intermittently communicated between the locating circuit and the plurality of monitoring units, wherein the omnidirectional signal is transmitted at a frequency of at least 3.244 GHz (block 206). A duration of transmission time of the omnidirectional signal for each of the plurality of monitoring units and the locating circuit is determined (block 208). A location of the locating circuit is calculated using the determined duration of transmission time of the omnidirectional signal for each of the plurality of monitoring units and the locating circuit (block 210).

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

What is claimed is:

1. A system for locating an object comprising:
    a locating circuit substantially secured to the object;
    a plurality of monitoring units positioned remotely from the locating circuit, each positioned in a different location, wherein at least a portion of the plurality of monitoring units are positioned in an outdoor environment;
    an omnidirectional signal intermittently communicated between the locating circuit and the plurality of monitoring units; and
    a calculator in communication with each of the plurality of monitoring units, wherein the calculator determines a duration of transmission time of the omnidirectional signal between each of the monitoring units and the locating circuit and calculates a location of the locating circuit using the determined duration of transmission time for each of the monitoring units and the locating circuit.

2. The system for locating an object of claim 1, wherein the location of the locating circuit is expressed in three-dimensions.

3. The system for locating an object of claim 1, wherein the location of the locating circuit is accurate within at least 0.1 meters of a true location of the locating circuit.

4. The system for locating an object of claim 1, wherein the calculator determines a difference in the duration of transmission time of the omnidirectional signal relative to at least a first monitoring unit and the duration of transmission time of the omnidirectional signal relative to at least a second monitoring unit.

5. The system for locating an object of claim 1, wherein the omnidirectional signal is transmitted at a frequency between 3.244 GHz and 6.99 GHz.

6. The system for locating an object of claim 1, wherein the plurality of monitoring units are positioned in non-planar locations.

7. The system for locating an object of claim 1, wherein the object further comprises a human being, wherein the locating circuit is secured to the human being with a band.

8. The system for locating an object of claim 1, wherein the portion of the plurality of monitoring units are positioned in an outdoor environment are housed in at least one substantially water resistant enclosure.

9. The system for locating an object of claim 1, further comprising an instruction mechanism in communication with the calculator, the instruction mechanism positioned to send at least one instruction to at least one instruction-receiving device when the calculated location of the locating circuit substantially matches a predetermined location.

10. The system for locating an object of claim 1, further comprising a tracking element, wherein the tracking element stores the calculated location of the locating circuit at a plurality of times.

11. The system for locating an object of claim 1, further comprising a display device in communication with the calculator, wherein the display device graphically displays the calculated location relative to a graphical depiction of at least one of a navigatable structure and an outdoor environment.

12. The system for locating an object of claim 1, further comprising an identification element assigned to the locating circuit, wherein the identification element corresponds to at least one characteristic of the object.

13. A method of locating an object, the method comprising the steps of:
    substantially securing a locating circuit to the object;
    remotely positioning a plurality of monitoring units from the locating circuit, wherein each of the plurality of monitoring units is positioned in a different location, wherein at least a portion of the plurality of monitoring units are positioned in an outdoor environment;
    intermittently communicating an omnidirectional signal between the locating circuit and the plurality of monitoring units, wherein the omnidirectional signal is transmitted at a frequency of at least 3.244 GHz;
    determining a duration of transmission time of the omnidirectional signal between each of the monitoring units and the locating circuit; and
    calculating a location of the locating circuit using the determined duration of transmission time of the omnidirectional signal for each of the monitoring units and the locating circuit.

14. The method of claim 13, further comprising the steps of:
    graphically displaying the calculated location of the locating circuit on a display device, with reference to at least one environmental feature; and
    expressing the calculated location of the locating circuit in at least two dimensions.

15. The method of claim 13, wherein the step of calculating a location of the locating circuit from the determined duration of transmission time time further comprises running at least one timing algorithm.

16. The method of claim 13, wherein the step of intermittently communicating an omnidirectional signal between the locating circuit and the plurality of monitoring units further comprises transmitting the omnidirectional signal at a frequency between 3.244 GHz and 6.99 GHz.

17. The method of claim 13, wherein the step of calculating a location of the locating circuit from the determined duration of transmission time further comprises calculating the location of the locating circuit to at least within 0.1 meters of a true location of the locating circuit.

18. The method of claim 13, further comprising the step of sending at least one instruction to at least one instruction-receiving device when the calculated location of the locating circuit substantially matches a predetermined location.

19. A system for locating an object in a substantially open-air environment, the system comprising:
- a locating circuit substantially secured to the object, the locating circuit having an omnidirectional signal intermittently transmitted;
- at least two sensors, each position in a distinct, substantially stationary location in a substantially open-air environment, wherein the at least two sensors are located in at least one vertical plane, and wherein the at least two sensors receive the omnidirectional signal;
- a substantially water resistant enclosure, housing at least a portion of each of the at least two sensors;
- a calculator in communication with each of the at least two sensors, wherein the calculator determines an elapsed time between an emission time of the omnidirectional signal by the locating circuit and receiving time of the omnidirectional signal at each of the at least two sensors and calculates a location of the locating circuit using the determined elapsed time for each of the at least two sensors; and
- a display element displaying a graphical representation of an open-air environment setting, wherein the calculated location of the locating circuit is expressed in at least two dimensions, relative to the graphical representation of the open-air environment.

20. The system for locating an object within a structure of claim 19, wherein
- the calculator determines an elapsed time between the emission time of the omnidirectional signal by the locating circuit and the receiving time of the omnidirectional signal at each of the at least two sensors by calculating a difference in the receiving time of the omnidirectional signal at each of the at least two sensors between each of the at least two sensors.

* * * * *